United States Patent [19]

Hank et al.

[11] Patent Number: 4,785,223
[45] Date of Patent: Nov. 15, 1988

[54] METHOD OF AND AN APPARATUS FOR GENERATING A PULSE TRAIN

[75] Inventors: Dietrich Hank; Friedrich Richter, both of Leipzig, German Democratic Rep.

[73] Assignee: Veb Kombinat Polygraph "Werner Lamberz" Leipzig, Leipzig, German Democratic Rep.

[21] Appl. No.: 816,045

[22] Filed: Jan. 3, 1986

[30] Foreign Application Priority Data

Mar. 28, 1985 [DD] German Democratic Rep. ..................................... 2745466

[51] Int. Cl.⁴ ............................................ G05B 21/02
[52] U.S. Cl. .................................. 318/636; 318/599; 364/178
[58] Field of Search .................... 318/636, 599, 341, 6; 364/178

[56] References Cited

U.S. PATENT DOCUMENTS

| | | | |
|---|---|---|---|
| 4,494,184 | 1/1985 | Crevel | 318/636 X |
| 4,511,830 | 4/1985 | Yamada et al. | 318/636 X |
| 4,642,542 | 2/1987 | McKeand | 318/636 |

*Primary Examiner*—Benjamin Dobeck
*Attorney, Agent, or Firm*—Michael J. Striker

[57] ABSTRACT

A method of generating a sampling signal succesion for use in a control system utilizing pulse-length modulated control signals, especially for controlling the tension or position of a continuously advancing web, such as in rotary printing machines, includes sampling and storing an error signal after a time interval having a duration approximately equal to an equalization time of the controlled system and commencing with the termination of a preceding adjustment step while the control system is out of operation, generating a binary signal of a length in time which is proportional to the error signal, sampling and storing a sum of the error signal and a deviation error signal during an additional time interval considerably shorter than the time constant of the controlled system, and extending the binary signal proportionally to the deviation control signal. An arrangement for performing the method includes two sampling devices connected in parallel to the output of a comparator and each including a series arrangement of a normally open contact, a storage unit, and a normally closed contact, the output of one sampling device being connected directly to a first input of a summing device and through another contact of the other sampling device to a second input of the summing device, while the output of the other sampling device is connected directly to a third input of the summing device. The output of the summing device is connected to inputs of a pulse-length modulator and a signum-forming element, whose outputs are connected to a control device for a drive.

5 Claims, 2 Drawing Sheets

METHOD OF AND AN APPARATUS FOR GENERATING A PULSE TRAIN

BACKGROUND OF THE INVENTION

The present invention relates to a method of generating pulse trains in general, and more particularly to a method of generating a sampling signal succession for use in control systems utilizing pulse-length modulated control signals, especially for controlling the tension or position of a continuously advancing web, and to an apparatus for performing the above method.

Methods and arrangements of the type here under consideration are already known and they are frequently used, for instance, in rotary printing machines, where it is required that a paper web advance in exact registry with the desired advancement path thereof. To accomplish this goal, it is necessary to provide control arrangements in the web advancing arrangements or cooperating with such web advancing arrangements.

In rotary printing machines equipped with rollers, like in many other application instances, the simplicity of the technical solution and the devices utilized in this solution is one of the main requirements. In the event that very simple control devices, which are also realizable by using relatively inexpensive components therein are used, then three-point control circuits (or other multi-point control circuits) are often being used. Three-point control circuits are already known (for instance, from the publication Taschenbuch Elektrotechnik in sech Bänden, edited by E Phillipow, Berlin, published by VEB Verlag Technik 1979, Vol. 4, p. 451). Such control circuits usually include a three-point or three-position switch having a tripping value a, and an integral member having an adjustment speed $\hat{y}$. Typical applications are obtained when the three-position switch, for instance, causes a motor to rotate in one or in the opposite sense, depending on the sense of the deviation or error signal, or switches the motor off. In such a case, the control circuit is fully suited to bring the value being controlled into a stable condition. However, a stable operation of such a control circuit is achievable only by selecting a relatively high tripping or actuation value a and a relatively small adjustment speed $\hat{y}$, and this is adversely reflected in the static accuracy and the settling time.

There are also already known (for instance, from the publication Taschenbuch Elektrotechnik in sechs Bänden, edited by E. Phillipow, Berlin, published by VEB Verlag Technik 1979, Vol. 4. p. 452) sampling control circuits. Such control circuit find widespread applications not only for simple tasks, but also when computers are being used. Among such known sampling control circuit are those in which the value to be controlled or the control deviation or error signal is discontinously sampled during a sampling period with a constant sampling frequency, so that the output signal of the control device is available only during a part of the sampling period. Herein, the output signal can be a binary signal having a length in time that is proportional to the analog or discrete value of the error signal, that is, this output signal is produced from the error signal value by an analog or discrete pulse length modulation. The servomotor which is connected to the output of the control device is merely switched on or off, so that it runs at a constant adjustment speed during adjustment periods of different durations. The servomotor, which acts in an integrating manner, performs in addition to its adjustment function also the function of a storage member which is necessary in sampling control circuits for the continous presentation of the adjustment signal.

Especially this solution principle finds widespread acceptance as a technically closed solution because of its simplicity and its simple automatic control adaptability in a relatively large number of applications. This solution further has the advantage of good dynamic properties in apparatus with compensation, in that the control device, in a sense, waits during the sampling intermissions to find out what effect the preceding adjustment operation has had.

In the field of use of rotary printing machines equipped with rollers, it is to be borne in mind when designing web-tension or web-position control systems that what is involved is a control stretch with a compensation of the first order, the equalization time $t_a$ of which satisfies the relationship $t_a \approx 3 \cdot L/v$, wherein L is the web displacement during the equalization process and v is the web speed, that is, the equalization time $t_a$ is dependent on the web speed v. For achieving a high control factor, the sampling operation is conducted at a sampling frequency which is dependent on the web speed, in that a pulse generator or clock which is driven from the printing machine generates a predetermined number of scanning pulses per revolution of the printing cylinder. Herein, a minimum time duration length is necessary for the scanning period, which is equal to the sum of the time intervals formed from the adjustment time needed for an adjustment step with the maximum adjustment width and the equalization time necessary for the equalization. Only when the new sampling, which corresponds to the feedback indicative of the effected adjustment result, occurs after the termination of the equalization time, can the sampling and control operation be brought exactly to a standstill already after one adjustment step.

The thus produced sampling frequency has the disadvantage that it is independent of the time duration or length of the adjustment signal. Also, it remains out of consideration that the commencement in time of the equalization time depends on the time duration of the adjustment step, as well as that no equalization occurs when an adjustment action in the event of a tolerable value of the error signal, that is, that it is not necessary to wait for the expiration of the equalization time. This disadvantage stands in the way of a further increase in the control factor.

An important drawback of the known sampling control devices resides in the fact that they react only to the amount or value of the error signal. Inasmuch as the equalization time which is dependent on the web speed becomes effective even in the event of occurrence of disturbance variable action, the effect of any disturbance variable action which is captured or detected during the sampling operation while still in formation can be counteracted only by a multi-step sampling control operation. Even this drawback is an obstruction to a further increase in the control factor.

SUMMARY OF THE INVENTION

Accordingly, it is a general object of the present invention to avoid the disadvantages of the prior art.

More particularly, it is an object of the present invention to develop a control method of the type here under consideration which does not possess the disadvantages of the known methods of this type.

Still another object of the present invention to provide a method of the above type which is particularly suited for use in controlling the web tension or the web position in a rotary printing machine both during the start of the printing operation and during the continuous operation of the printing machine.

A concomitant object of the present invention is to devise an apparatus which is particularly suited for the performance of the above method and which operates on the sampling principle.

It is yet another object of the present invention so to construct the apparatus of the above type, as to be relatively simple in construction, inexpensive to manufacture, easy to use, and reliable in operation nevertheless.

An additional object of the present invention is so to design the apparatus as to have a static and dynamic behavior which is optimum over the entire range of web speeds.

In pursuance of these objects and others which will become apparent hereafter, one feature of the present invention resides in a method of generating a sampling signal succession or train for use in control systems utilizing pulse-length modulated control signals, especially for controlling the tension or position of a continuousl advancing web, this method comprising a first step including forming a time interval commencing with the termination of a preceding adjustment step and having a duration approximately equal to an equalization time $t_a$ of the controlled system, which is associated with the printing plate cylinder rotational speed, interrupting the operation of the control system for the duration of the time interval, and sampling and storing an error signal $x_w$ commencing with the end of the time interval; and a second step immediately following the first step and including generating a binary signal for the performance of an adjustment step by an adjustment drive, the length of the binary signal in time being proportional to the error signal $x_w$.

A practical realization of the first step is achieved in that a clock or pulse generator which is driven by the printing machine generates a predetermined number of clock pulses per revolution of the printing plate cylinder and thus controls a timing device. A storage member is activated for the duration of the aforementioned time interval. The control circuit is interruptible and closable for the purpose of sampling by means of sampling devices. The realization of the second step is achieved by using a pulse length modulator which is connected to the output of the sampling device.

When the sampling control is to operate with a derivative action (differentiated behavior), the method of the present invention includes two additional steps, namely, a third step which includes forming an additional time interval $\Delta t_M$ commencing simultaneously with the commencement of the sampling that occurs after the first step and having a duration which is considerably shorter than a time constant $\tau_S$ of the controlled system, and sampling and storing a sum of the error signal $x_w$ and a deviation error signal $\Delta x_w$ commencing with the termination of the additional time interval $\Delta t_M$; and a fourth step immediately following the third step and including determining the increase in the deviation error signal $\Delta x_w$ during the additional time interval $\Delta t_M$, combining a portion $(\tau_S/\Delta t_M)\cdot\Delta x_w$ which is proportional to the increase in the deviation error signal $\Delta x_w$ with the error signal $x_w$ sampled during the first step, and extending the binary length-modulated signal obtained during the second step in time by a portion proportional to the portion $(\tau_S/\Delta t_M)\cdot\Delta x_w$ of the combining step.

The formation of the additional time interval $\Delta t_M$ during the third step is accomplished by means that is of the same or similar construction as the means used for the formation of the time interval during the performance of the first step. The second sampling and storing of the deviation error signal $\Delta x_w$ can be accomplished, for instance, by a second sampling device.

For the realization of the fourth step, the formation and combination or overlapping of the portion $(\tau_S/\Delta t_M)\cdot\Delta x_w$ accomplished by the use of a summing device. The proportional time-extension of the binary length-modulated control signal is accomplished by the pulse-length modulator in accordance with its characteristic behavior curve.

In accordance with a further facet and expansion of the method of the present invention, the step succession consisting of the first and second, or the succession consisting of all of the first to fourth steps, is repeated at least once.

In accordance with a further development of the method of the present invention, in the event that the error signal sampled after the first or after the first and third step is toleratable and thus an adjustment step is not conducted, the first step of the next following succession of operating steps is modified in such a way that a further time interval $\Delta t_R$ is formed during the first step commencing simultaneously with the commencement of the sampling that occurs after the third step of the preceding step succession and having a duration which is considerably shorter than the equalization time $t_a$ of the controlled system, that the operation of the control system is interrupted for the duration of the further time interval $\Delta t_R$, and that the error signal $x_w$ is sampled and stored commencing with the termination of the further time interval $\Delta t_R$.

The realization of this modified step is accomplished, for instance, in that the sampled error signal $x_w$ is supplied to a threshold value switch which sets a storage member when an activation or threshold value has not been reached and thus causes the timing device to form the further time interval $\Delta t_R$ instead of the time interval $t_a$.

According to another concept of the present invention, there is proposed a sampling control arrangement which comprises a comparator having an output; a first and a second controllable sampling device connected in parallel with one another to the output of the comparator and each including a series arrangement of a normally closed contact, a storage unit, and a normally open contact, the sampling devices having respective outputs and the second sampling device including an additional normally open contact connected to the output of the first sampling device; a summing member having a first input operating with a transfer factor of at most 1 and connected directly to the output of the first sampling device, a second input operating with a transfer factor of $-c$ and connected to the output of the first sampling device via the additional contact, and a third input operating with a transfer factor of $+c$ and connected directly to the output of the second sampling device, and an output; a pulse-length modulator and a signum-forming element each having an input connected to the output of the summing member and an output; and a control device having at least two inputs one connected to the output of the pulse-length modulator and the other to the output of the signum-forming element.

A control input of each of the first and second sampling devices is connected with a respective different output of a circuit arrangement for the production of the sampling pulse successions, this circuit arrangement being further connected to the output of a clock or pulse generator driven from the printing machine, to the output of the pulse-length modulator, and to the output of the summing device.

After the termination of the respective preceding adjustment operation, the contacts of the first and of the second sampling devices assume their respective rest positions for a time interval which is approximately equal to the equalization time $t_a$ of the controlled system, and the error signal $x_w$ is accepted and stored by each of the two sampling devices. Subsequently, the contacts of the first sampling device are brought into their operated positions, so that the error signal $x_w$ propagates through the normally open but now closed contact from the storage unit of the first sampling device to the first input of the summing device, this first input operating, for instance, with a transfer factor of 1. At the same time, the normally closed but now open contact of the first sampling device separates the storage unit of the first sampling device from the comparator. The output of the summing device is supplied to the inputs of the pulse-length modulator and of the signum-forming element, this output signal being constituted by the error signal. Depending on the characteristic behavior curve of the pulse-length modulator and of the signum-forming element, a pulse-length modulated binary control signal and a direction signal are supplied to the drive control arrangement of a servomotor.

Relative to the commencement of the first sampling, the contacts of the second sampling device are brought into their active or operating positions after the expiration of the additional time interval $\Delta t_M$ which is much shorter than the time constant $\tau_S$ of the system being controlled. This means that the error signal $x_w + \Delta x_w$ propagates from the storage unit of the second sampling device to the third input of the summing device, the third input operating with the transfer factor of $+c$. At the same time, the normally open further contact of the second sampling device is closed, so that the error signal $x_w$ propagates also from the storage unit of the first sampling device to the second input of the summing device, this second input operating with the transfer factor of $-c$. The normally closed, now open, contact of the second sampling device separates the storage unit of the second sampling device from the comparator at this time. The output of the summing device is connected to the inputs of the pulse-length modulator and of the signum-forming element, so that these inputs receive a combination or overlap signal value $x_w + \Delta x_w$, wherein c equals the relationship or ratio $\tau_S/\Delta t_w$. In correspondence with the characteristic behavior curve of the pulse length modulator, a length-modulated output signal of the pulse-length modulator, which is extended in time proportionally to the portion $(\tau_S/\Delta t_M) \cdot \Delta x_w$, is supplied to the drive control arrangement of the servomotor. Upon the termination of an adjustment step $\hat{y}$ which is proportional to the peak $\hat{x}_w$ of the error signal to be expected, the contacts of the first and second sampling devices are again brought into their original rest positions, so that the initial position for the next scanning operation is assumed.

In the event that the first and second sampling have resulted in a toleratable value of the error signal $x_w(t)$, the contacts of the first and second sampling devices are brought, for the time interval $t_R$ which is considerably smaller than the equalization time $t_a$ of the system being controlled, in their rest or initial position after the completion of the second scanning operation. This means that the initial or starting position for the next following sampling operation has been achieved.

The present invention can also be realized with the use of a microcomputer system, in that a programmable counter-timing device circuitry is controlled to operate as a counter and is furnished with pulses issued by a pulse generator that is driven by the machine. Then, a read/write memory with selective addressing can be used to emulate or perform the function of the flip-flops, while the switching conditions and switching dependencies are performed in accordance with a succession of commands stored in a permanent memory.

The novel features that are considered as characteristic of the invention are set forth in particular in the appended claims. The improved sampling arrangement itself, both as to its construction and its mode of operation, together with additional feaures and advantages thereof, will be best understood upon perusal of the following description of certain specific embodiments with reference to the accompanying drawing.

DETAILED DESCRIPTION OF THE PREFERRED EMBODIMENT

Figure 1:
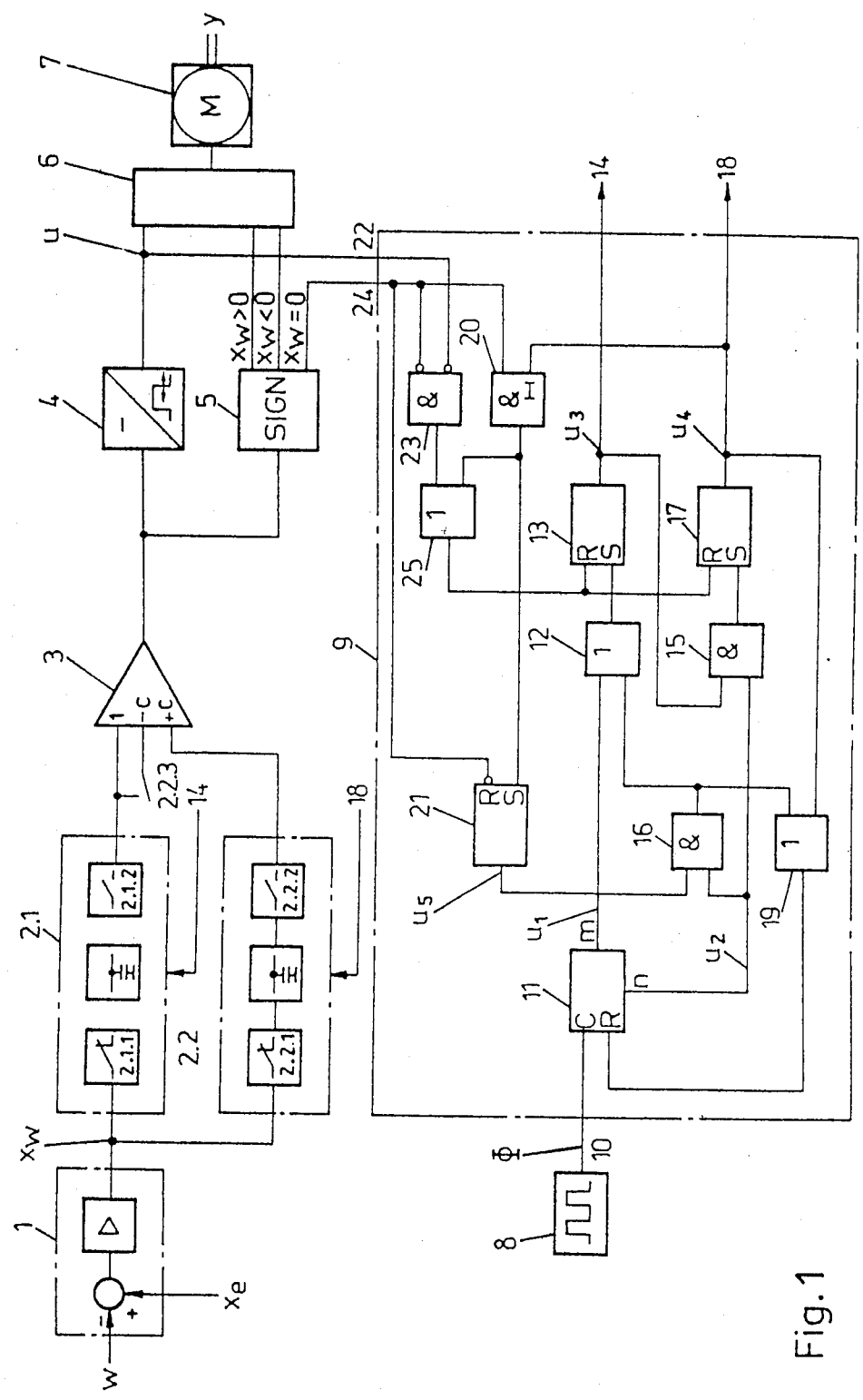
FIG. 1 is a circuit diagram of a sampling control arrangement in accordance with the present invention, together with an adjustment drive and with a switching circuit for the production of the sampling pulse successions.

Referring now to the drawing in detail, and first to FIG. 1 thereof, it may be seen that the reference numeral 1 has been used therein to identify a comparator device. A first sampling arrangement 2.1 and a second sampling arrangement 2.2 are connected in parallel to the output of the comparator device 1. The sampling arrangements 2.1 and 2.2 respectively include a normally closed contact 2.1.1 or 2.2.1, an analog storage unit 2.1.2 or 2.2.2 and a normally open contact 2.1.3 and 2.2.3, the elements 2.1.1, 2.1.2 and 2.1.3, on the one hand, and the elements 2.2.1, 2.2.2 and 2.2.3, on the other hand, being arranged in series with one another. The output of the sampling arrangement 2.1 is connected directly with a first input of a summing arrangement 3, this first input operating with a transfer factor of 1. In addition, the output of the sampling arrangement 2.1 is connected, via a further normally open contact 2.2.4 of the sampling arrangement 2.2, with a second input of the summing arrangement 3, this second input operating with a transfer factor of $-c$. The output of the second sampling arrangement 2.2 is connected to a third input of the summing arrangement 3, this third input operating with a transfer factor of $+c$. The output of the summing arrangement 3 is connected with the input of a pulse length modulator 4 and also with the input of a signum-forming element 5. The output of the pulse length modulator 4 and the output of the signum-forming element 5 are connected to corresponding inputs of a drive control arrangement 6 of a servomotor 7.

A control input of the sampling arrangement 2.2 is connected with a control output 14, and a control input of the sampling arrangement 2.1 is connected with another control output 18, of a circuit arrangement 9 which is constructed and operative for producing the requisite sampling pulse trains. The circuit arrangement 9 is further connected via an input 10 with a clock generator 8, via another input 22 to the output of the pulse length modulator 4, and via an additional input 24 to a result output $x_w=0$ of the signum-forming element 5.

The input 10 of the circuit arrangement 9, and thus the output of the clock generator 8, is connected with a counting input of a pulse counter 11 which is provided as a timing element and which has a counting volume of m, so that the time interval of the counting operation up to the reaching of the last counting step is approximately equally long as an equalization time period $t_a$ for an adjustment step which is associated with the printing plate cylinder rotational speed. The output value m of the pulse counter 11 is supplied to a first input of an OR-gate 12. A flip-flop circuit 13 which controls the operation of the sampling arrangement 2.1 has a setting input which is connected to the output of the OR-gate 12, a resetting input, and an output which is connected to the control output 14 and thus to the control input of the sampling arrangement 2.1, as well as to a first input of an AND-gate 15. The pulse counter 11 further includes a counting output carrying a counting value of n, wherein n satisfies the condition $n < < m/3$. This counting output is connected to a second input of the AND-gate 15, as well as to a first input of another AND-gate 16.

A second flip-flop circuit 17 which controls the sampling arrangement 2.2 has a setting input which is connected to the output of the AND-gate 15, a resetting input, and an output which is connected to the control output 18 and thus to the control input of the second sampling arrangement 2.2, to a first input of a futher OR-gate 19, and a first, delayed-action, input of an AND-gate 20.

Another flip-flop circuit 21, which is activated after an accomplished second sampling in the event that the first and second samplings have resulted in a toleratable output error $x_w(t)$, has a setting input connected with the output of the AND-gate 20, a resetting input, and an output which is connected to a second input of the AND-gate 16. The output of the pulse-length modulator 4 is further connected, via the input 22 of the circuit arrangement 19, to a first inverting input of an AND-gate 23. The result output $x_w=0$ of the signum-forming element 5 is further connected, via the input 24 of the circuit arrangement 9, with a second inverting input of the AND-gate 23 and also to the resetting input of the flip-flop circuit 21. The output of the AND-gate 20 is connected with a first input of an additional OR-gate 25, while the output of the AND-gate 23 is connected with a second input of the additional OR-gate 25. The output of the additional OR-gate 25 is connected with the resetting input of the flip-flop circuit 13, as well as with the resetting input of the flip-flop circuit 17. The output of the AND-gate 16 is connected to a second input of the OR-gate 12 and to a second input of the OR-gate 19. The output of the OR-gate 19 is connected with a statically operating resetting input of the pulse counter 11.

Having so described the construction of the circuitry depicted in FIG. 1 of the drawing, the operation of such circuitry will now be discussed, starting with the termination of the respective preceding adjustment step. At this time, the contacts 2.1.1, 2.1.3, 2.2.1, and 2.2.3 of the sampling arrangements 2.1 and 2.2 are in their respective rest positions, that is, the contacts 2.1.1 and 2.2.1 are closed, and the contacts 2.1.3 and 2.2.3 are open. This means that the output error $x_w$ issued by the comparator device 1 is accepted and stored by each of the two sampling arrangements 2.1 and 2.2 in the respective analog storage units 2.1.2 and 2.2.2. The clock generator 8 generates during each revolution of the printing-plate cylinder a predetermined number of clock pulses. These clock pulses are supplied to the counting input of the pulse counter 11. The resetting input of the pulse counter 11 is inactivated at this time. The pulse counter 11 begins the count with the next following clock pulse received from the clock generator 8. When the last counting step has been reached, the equalization time period $t_a$ for the preceding adjustment step has elapsed, and the output m of the pulse counter 11 is activated. This results, via the OR-gate 12, in the setting of the flip-flop circuit 12. The now activated output of the flip-flop circuit 12 switches the first sampling arrangement 2.1 into its operating condition and simultaneously prepares the AND-gate 15 for activation for the setting of the flip-flop circuit 17.

The output error $x_w$ now propagates from the storage unit 2.1.2 through the now closed contact 2.1.3 to the first input of the summing arrangement 3. At this time, the storage unit 2.1.2 is separated from the comparator device 1 by the now open contact 2.1.1. The value appearing at the output of the summing arrangement 3 is supplied to the input of the pulse-length modulator 4 and to the input of the signum-forming element 5, this value being constituted by the output error $x_w$ under these circumstances. As a result of the operation of the modulator 4 and of the element 5, a length-modulated binary signal and a direction signal reach the drive control arrangement 6 of the servomotor 7. At this juncture, it is to be mentioned that all of the circuit components referred to above are well known and readily available to those active in the field of designing control circuits, so that structural details of such components need not be discussed here.

The pulse counter 11 commences a new counting cycle with the next following clock pulse. When the n-th counting step of this counting cycle has been reached, which means that a time interval $\Delta t_M$ has elapsed, the output n of the pulse counter 11 is activated. This results in the setting of the flip-flop circuit 17 via the previously prepared and now activated AND-gate 15. The now activated output of the flip-flop circuit 17 switches the sampling arrangement 2.2 into its operating condition and further activates via the OR-gate 19 the statically operating resetting input of the pulse counter 11, so that the counting is interrupted.

At this time, the output error $x_w$ stored in the storage unit 2.1.2 reaches via the now closed contact 2.2.4 the second input of the summing arrangement 3, while the output error $x_w + \Delta x_w$ reaches the third input of the summing arrangement 3 via the now closed contact 2.2.3. The contact 2.2.1, which is now in its open position, separates the storage unit 2.2.2 of the sampling arrangement 2.2 from the comparator device 1. The inputs of the pulse length modulator 4 and of the signum-forming element 5 are supplied at this time from the output of the summing arrangement 3 with a combination signal $x_w + c \cdot \Delta x_w$, wherein c equals the expression $\tau_S/\Delta t_M$. A control signal which is extended in time proportionally to the value of the portion $(\tau_S/\Delta t_M) \cdot \Delta x_w$ reaches the drive control arrangement 6 via the pulse-length modulator 4, being time-length or duration modulated by the latter. With the termination of an adjustment step ŷ which is proportional to the peak value $\hat{x}_w$ of the output error $x_w$ to be expected, the flip-flop circuits 13 and 17 are reset via the AND-gate 23 and the OR-gate 25, so that the initial position for the next sampling period is now assumed to have been reached.

In the event that the first sampling has resulted in a toleratable output error $x_w$ and the second sampling has resulted in a toleratable output error $x_w + x_w$, as indicated by the activation of the result output $x_w = 0$ of the signum-forming element 5, the flip-flop circuit 21 is set by the then activated output of the flip-flop circuit 17, with a time delay sufficient for the acceptance and processing of the combined signal by the signum-forming element 5, via the AND-gate 20, and the flip-flop circuits 13 and 17 are reset via the AND-gate 20 and the OR-gate 25, while the setting of the flip-flop circuit 13 is prepared at the AND-gate 16 and a new counting cycle is initiated via the OR-gate 19; the initial position for the next following sampling period has been assumed. When the n-th counting step has been reached, a time interval $\Delta t_R$ has elapsed (a circuit simplification is obtained by making $\Delta t_R = \Delta t_M$); the setting of the flip-flop circuit 13 is achieved via the AND-gate 16, and the first sampling operation is commenced.

In the case that the first sampling operation results in an untoleratable output error $x_w$, then the result output $x_w = 0$ of the signum-forming element 5 is inactivated, and the flip-flop circuit 21 is reset.

Figure 2:
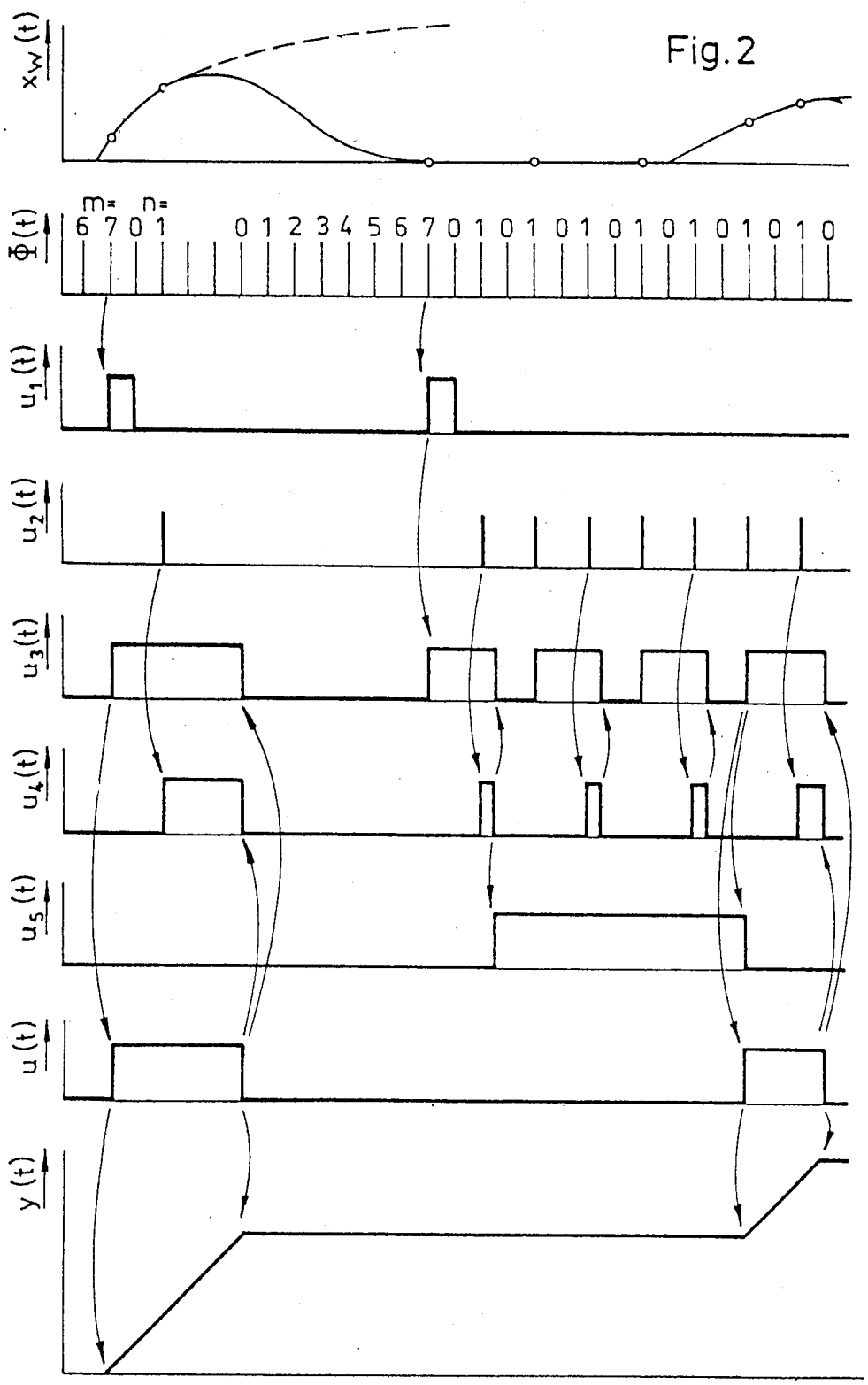
FIG. 2 is a representation of the various function-related output signals of the arrangement of FIG. 1.

The operation of the arrangement of FIG. 1 can be ascertained, in addition to the above description, from FIG. 2 of the drawing, in which the various signal values are presented at the ordinates and time at the abscissae of the various diagrams, these signal values corresponding to those indicated at the various points of the circuit diagram of FIG. 1.

It will be understood that each of the elements described above, or two or more together, may also find a useful application in other types of arrangements differing from the type described above.

While the invention has been illustrated and described as embodied in a control arrangement for a servomotor of a printing plate cylinder of a printing machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. A method of generating a sampling signal succession for use in a system for controlling the tension or position of a continuous web advancing in synchronism with the rotation of a printing plate cylinder, comprising a first step of forming a first time interval having a duration approximately equal to an equalization time $t_a$ of the controlling system, which is proportional to the rotational speed of the printing plate cylinder and, during the first time interval, interrupting the operation of the controlling system, sampling the tension- or position value of the web, and storing an ascertained error signal $x_w$; and a second step immediately following the termination of said first time interval and including generating in the controlling system a pulse-length modulated binary signal for the performance of an adjustment step by an adjustment drive, the length of said binary signal being proportional to the error signal $x_w$.

2. The method as defined in claim 1, and further comprising repeating the succession of said first and second steps at least once, and said first time interval starting at the end of the preceding pulse-length modulated binary signal.

3. A method of generating a sampling signal succession for use in a system for controlling the tension or position of a continuous web advancing in synchronism with the rotation of a printing plate cylinder, comprising a first step of forming a first time interval having a duration approximately equal to an equalization time $t_a$ of the controlling system, which is proportional to the rotational speed of the printing plate cylinder and, during the first time interval, interrupting the operation of the controlling system, sampling the tension- or position value of the web, and storing an ascertained error signal $x_w$; a second step immediately following the termination of said first time interval and including generating in the controlling system a pulse-length modulated binary signal for the performance of an adjustment step by an adjustment drive, the length of said binary signal being proportional to the error signal $x_w$; and further comprising a third step including forming an additional time interval $\Delta t_M$ commencing simultaneously with the commencement of the sampling that occurs after said first step and having a duration which is considerably shorter than a time constant $\tau_S$ of the controlling system, and sampling and storing a sum of said error signal $x_w$ and a deviation error signal $\Delta x_w$ commencing with the termination of said additional time interval $\Delta t_M$; and a fourth step immediately following said third step and including determining the increase in the deviation error signal $\Delta x_w$ during said additional time interval $\Delta t_M$, combining a portion $(\tau_S/\Delta t_M) \cdot \Delta x_w$ which is proportional to said increase in said deviation error signal $\Delta x_w$ with said error signal $x_w$ sampled during said first step, and extending said binary length-modulated signal obtained during said second step in time by a portion proportional to the portion $(\tau_S/\Delta t_M) \cdot \Delta x_w$ obtained as a result of of the combining step.

4. The method as defined in claim 3, and further comprising repeating the succession of said first, second, third and fourth steps at least once.

5. The method as defined in claim 3 and further comprising determining if a toleratable value of the error signal $x_w$ has been encountered during the sampling following said first step and a toleratable value of the sum $x_w + \Delta x_w$ has been encountered during the sampling following said third step; and, in the event that the result of both determinations is positive, modifying the next following step succession in such a manner that a further time interval $\Delta t_R$ is formed during the first step commencing simultaneously with the commencement of the sampling that occurs after said third step of the preceding step succession and having a duration which is considerably shorter than the equalization time $t_a$ of the controlled system, that the operation of the control system is interrupted for the duration of the further time interval $\Delta t_R$, and that the error signal $x_w$ is sampled and stored commencing with the termination of the further time interval $\Delta t_R$.

* * * * *